US007319681B2

(12) United States Patent
Park

(10) Patent No.: US 7,319,681 B2
(45) Date of Patent: Jan. 15, 2008

(54) METHOD AND APPARATUS FOR SECURING MEDIA ACCESS CONTROL (MAC) ADDRESSES

(75) Inventor: Soo-hong Park, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 94 days.

(21) Appl. No.: 11/242,060

(22) Filed: Oct. 4, 2005

(65) Prior Publication Data

US 2006/0104243 A1    May 18, 2006

Related U.S. Application Data

(60) Provisional application No. 60/627,018, filed on Nov. 12, 2004.

(30) Foreign Application Priority Data

Dec. 14, 2004   (KR) ...................... 10-2004-0105619

(51) Int. Cl.
*H04Q 7/32* (2006.01)
*H04Q 7/20* (2006.01)

(52) U.S. Cl. ...................... 370/331; 370/328; 370/313; 713/150; 713/171; 713/162; 713/170; 713/168; 713/190; 455/410; 455/411; 455/422.1; 455/403; 455/500; 455/517; 380/247; 380/277; 380/278; 380/255; 380/264; 380/270

(58) Field of Classification Search ............... 380/277, 380/278, 255, 264, 270, 271, 247, 380; 713/150, 713/171, 162; 455/500, 517, 412.1, 412.2, 455/432.1, 435.1, 435.2, 550.1, 551, 552.1, 455/558, 575.1
See application file for complete search history.

(56) References Cited

U.S. PATENT DOCUMENTS

| 2002/0152380 A1* | 10/2002 | O'Shea et al. ............... 713/170 |
| 2003/0142673 A1* | 7/2003 | Patil et al. .................. 370/392 |
| 2004/0029584 A1 | 2/2004 | Le et al. |
| 2005/0018686 A1* | 1/2005 | Igarashi et al. .......... 370/395.2 |

FOREIGN PATENT DOCUMENTS

| EP | 1075117 A2 | 2/2001 |
| JP | 2003-298619 A | 10/2003 |
| KR | 10-2004-0020518 A | 3/2004 |
| KR | 10-2004-0056392 A | 7/2004 |
| KR | 10-2004-0060365 A | 7/2004 |

OTHER PUBLICATIONS

Alberto Escudero Pascual, "Privacy Extensions for Stateless Address Autoconfiguration in IPV6-" Requirement for Unobservability, pp. 43-47.
IEEE 802.20 Working Group on Mobile Broadband Wireless Access <http://grouper.ieee.org/groups/802/20/>, "Adaption Interface for Seamless Handover between 802.20MBWA/802.11/802.15," Nov. 5, 2003, pp. 1-5.

* cited by examiner

*Primary Examiner*—Keith Ferguson
(74) *Attorney, Agent, or Firm*—Sughrue Mion, PLLC

(57) ABSTRACT

An apparatus and method for securing media access control (MAC) addresses in a wireless local area network (LAN) environment are provided. In the method of securing MAC addresses, a cryptographically generated address (CGA) is generated using a predetermined cipher algorithm, a ciphered MAC address is extracted from the CGA, and communication is performed using the ciphered MAC address. Accordingly, it is possible to strengthen the security of MAC addresses.

15 Claims, 6 Drawing Sheets

METHOD AND APPARATUS FOR SECURING MEDIA ACCESS CONTROL (MAC) ADDRESSES

This application claims the benefit of U.S. Provisional Application No. 60/627,018, filed on Nov. 12, 2004, in the U.S. Patent and Trademark Office, and Korean Patent Application No. 10-2004-0105619, filed on Dec. 14, 2004, in the Korean Intellectual Property Office, the disclosures of which are incorporated herein in their entirety by reference.

BACKGROUND OF THE INVENTION

1. Field of the Invention

The present invention relates to an apparatus and method for securing media access control (MAC) addresses in a wireless local area network (LAN) environment.

2. Description of the Related Art

FIG. 1 is a diagram illustrating a conventional wireless LAN environment. Referring to FIG. 1, the conventional wireless LAN environment includes a mobile station 1, access point (AP) A (21), AP B (22), AP C (23), access router (AR) A (31), and AR B (32).

Suppose that the mobile station 1 moves from a basic service set (BSS) managed by AP A (21) to a BSS managed by AP B (22) and from the BSS managed by AP B(22) to a BSS managed by AP C (23). A BSS is a wireless LAN based on the IEEE 802.11 standard. AR A (31), AP A (21) and AP B (22) managed by AR A (31), and the BSSs managed by AP A (21) and AP B (22) constitute a first subnet. Likewise, AR B (32), AP C (23), and the BSS managed by AP C (23) constitute a second subnet. In short, the mobile station 1 can move from the first subnet to the second subnet by departing from the BSS managed by AP B (22) and entering the BSS managed by AP C (23).

According to the IEEE 802.11 standard, the mobile station 1 searches for an AP that it can currently communicate with in a passive or active manner. In the passive manner, the mobile station 1 searches for the AP that it can currently communicate with by receiving beacon frames from AP A (21), AP B (22), and AP C (23). Alternatively, in the active manner, the mobile station 1 searches for the AP that it can currently communicate with by transmitting probe request frames to AP A (21), AP B (22), and AP C (23).

If the AP that can currently communicate with the mobile station 1 is AP A (21), the mobile station 1 transmits an association request frame or re-association request frame to AP A (21) using its MAC address as a source address and the MAC address of AP A (21) as a destination address in order to associate or re-associate with AP A (21). Thereafter, the mobile station 1 confirms that it has associated or re-associated with AP A (21) when receiving a response frame from AP A (21) and communicates with terminals in a wired network via AP A (21). An example of the wired network is the Internet.

As described above, the mobile station 1 uses MAC addresses when communicating with AP A (21), AP B (22), or AP C (23) in a link layer. However, the mobile station 1 uses IP addresses when communicating with terminals on the Internet via AP A (21), AP B (22), or AP C (23) in an Internet protocol (IP) layer.

FIG. 2 is a diagram illustrating the formats of conventional addresses. Referring to FIG. 2, a conventional MAC address is comprised of a company identifier field 101, which is managed by the IEEE, and an extension identifier field 102, which is managed by a manufacturer of a network interface card. The conventional MAC address is determined when the network interface card is manufactured. The network interface card has a unique MAC address of its own. Accordingly, the mobile station 1 with the network interface card installed therein also has a unique MAC address of its own.

A conventional IP version 6 (IPv6) address is comprised of a subnet prefix field 201 and an interface identifier field 202. The interface identifier field 202 is comprised of a company identifier field 101, which is comprised of 24 most significant bits of the conventional MAC address, FFFE 103, and an extension identifier Field 102, which is comprised of 24 least significant bits of the conventional MAC address.

As described above, the mobile station 1 has a unique MAC address of its own. Thus, if a third person knows about the MAC address of the mobile station 1, he or she can also know about a station or a user that currently communicates with an AP. Therefore, the third person can interfere with an authorized person's communication with the AP, can steal the authorized person's personal information, or can exploit the authorized person's communication with the AP for illegal purposes. In short, the security of conventional MAC addresses is flawed.

SUMMARY OF THE INVENTION

The present invention provides an apparatus for and method of securing MAC addresses, which can prevent an unauthorized person or party from exploiting the MAC addresses with malicious intent.

The present invention also provides a computer-readable recording medium for storing a program enabling the method of securing MAC addressees.

According to an aspect of the present invention, there is provided a method of securing addresses. The method includes: generating a ciphered first address using a predetermined cipher algorithm; extracting a ciphered second address from the ciphered first address; and communicates using the ciphered second address.

According to another aspect of the present invention, there is provided an apparatus for securing addresses. The apparatus includes: a first address generation unit, which generates a ciphered first address using a predetermined cipher algorithm; a second address extraction unit, which extracts a ciphered second address from the first ciphered address; and a communication unit, which communicates using the ciphered second address.

According to another aspect of the present invention, there is provided a computer-readable recording medium for storing a program enabling a method of securing addresses. The method includes: generating a ciphered first address using a predetermined cipher algorithm; extracting a ciphered second address from the ciphered first address; and communicating using the ciphered second address.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 3:
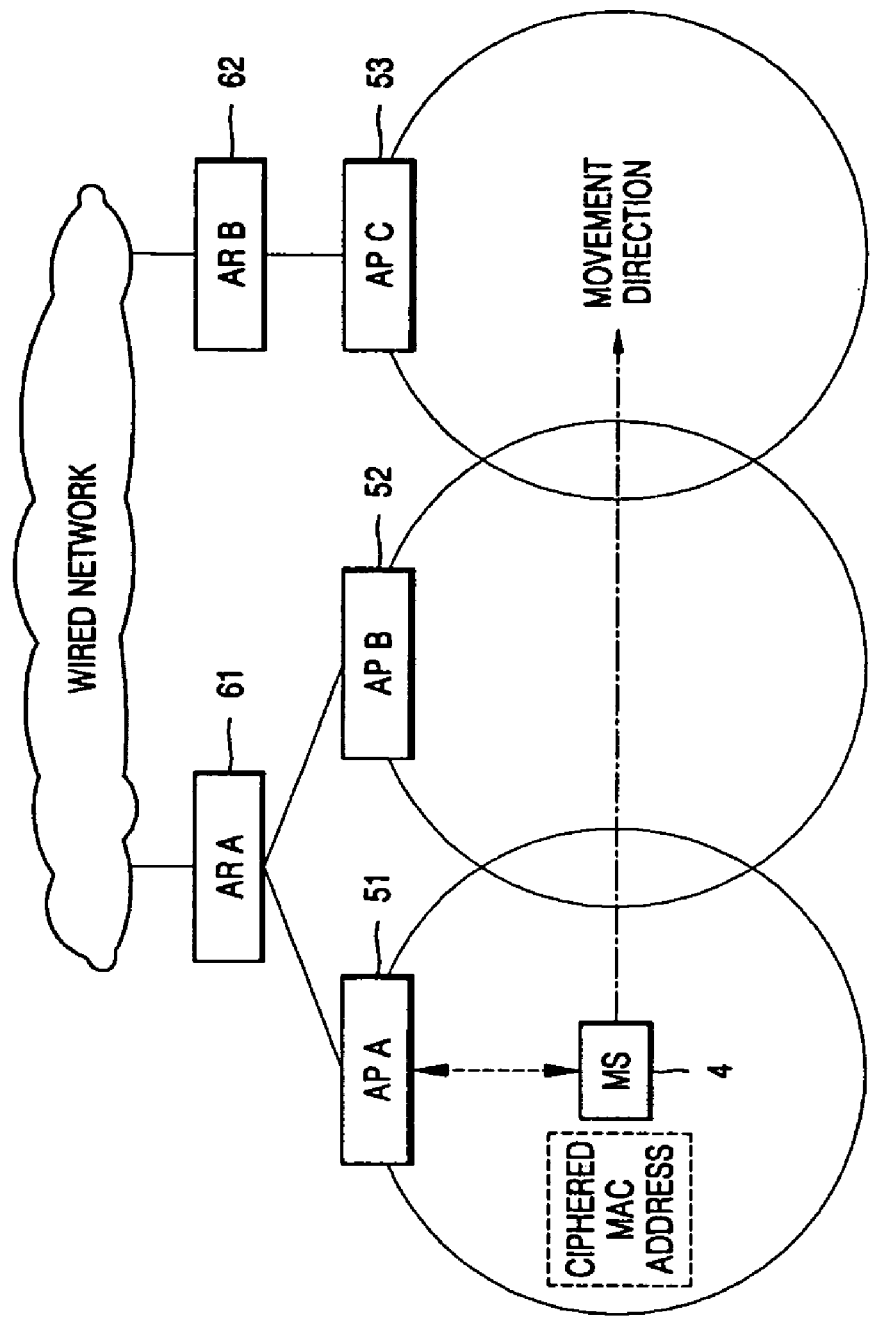
FIG. 3 is a diagram illustrating a wireless LAN environment according to an exemplary embodiment of the present invention.

FIG. 3 is a diagram illustrating a wireless LAN environment according to an exemplary embodiment of the present invention. Referring to FIG. 3, the wireless LAN environment includes a mobile station 4, AP A (51), AP B (52), AP C (53), AR A(61), and AR B (62).

Suppose that the mobile station 4 moves from a BSS managed by AP A (51) to a BSS managed by AP B (52) and from the BSS managed by AP B(52) to a BSS managed by AP C (53). AR A (61), AP A (51) and AP B (52), which are managed by AR A (61), and the BSSs managed by AP A (51) and AP B (52) constitute a first subnet. Likewise, AR B (62), AP C (53), and the BSS managed by AP C (53) constitute a second subnet. In short, the mobile station 1 can move from the first subnet to the second subnet by departing from the BSS managed by AP B (52) and enter the BSS managed by AP C (53).

The mobile station 4 communicates with AP A (51), AP B (52), and AP C (53) using ciphered MAC addresses in order to overcome the problems with conventional MAC addresses. In the present embodiment, the mobile station 4 extracts ciphered MAC addresses from cryptographically generated addresses (CGAs), which are specified in an Internet Engineering Task Force (IETF) draft draft-ietf-send-cga-06.txt.

Figure 4:
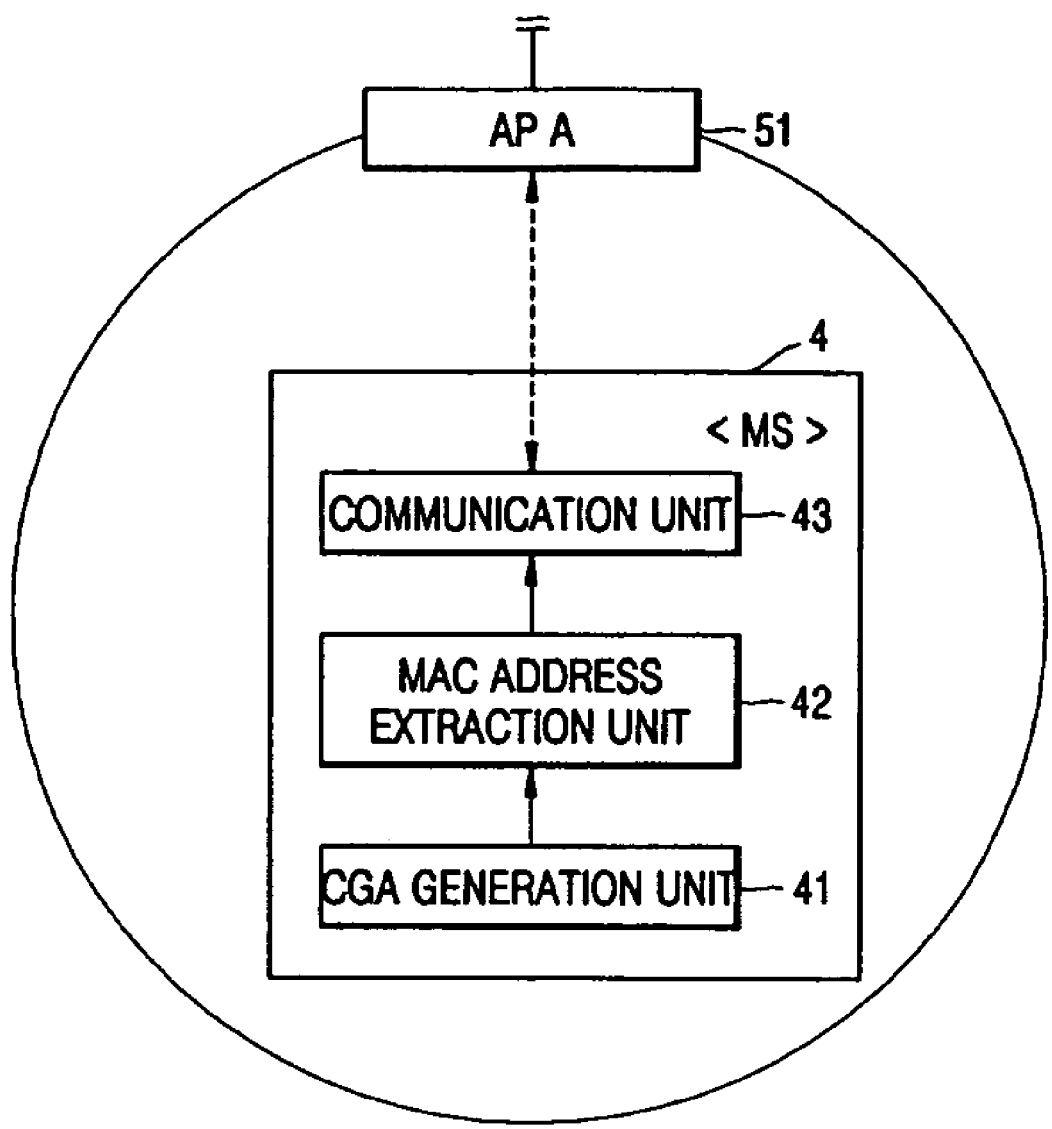
FIG. 4 is a block diagram of an apparatus for securing MAC addresses according to an exemplary embodiment of the present invention.

FIG. 4 is a block diagram of an apparatus for securing MAC addresses according to an exemplary embodiment of the present invention. Referring to FIG. 4, the apparatus includes a CGA generation unit 41, a MAC address extraction unit 42, and a communication unit 43. The apparatus for securing MAC addresses are installed in the mobile station 4 of FIG. 3. Obviously, the mobile station 4 may include elements other than the apparatus for securing MAC addresses.

The CGA generation unit 41 generates a CGA, which is an IPv6 address ciphered using the SHA-1 algorithm. The SHA-1 algorithm is a cipher algorithm using a unidirectional hash function. The MAC address extraction unit 42 extracts a ciphered MAC address from the CGA generated by the CGA generation unit 41. The generation of the ciphered MAC address will now be described in further detail with reference to FIG. 5.

Figure 5:
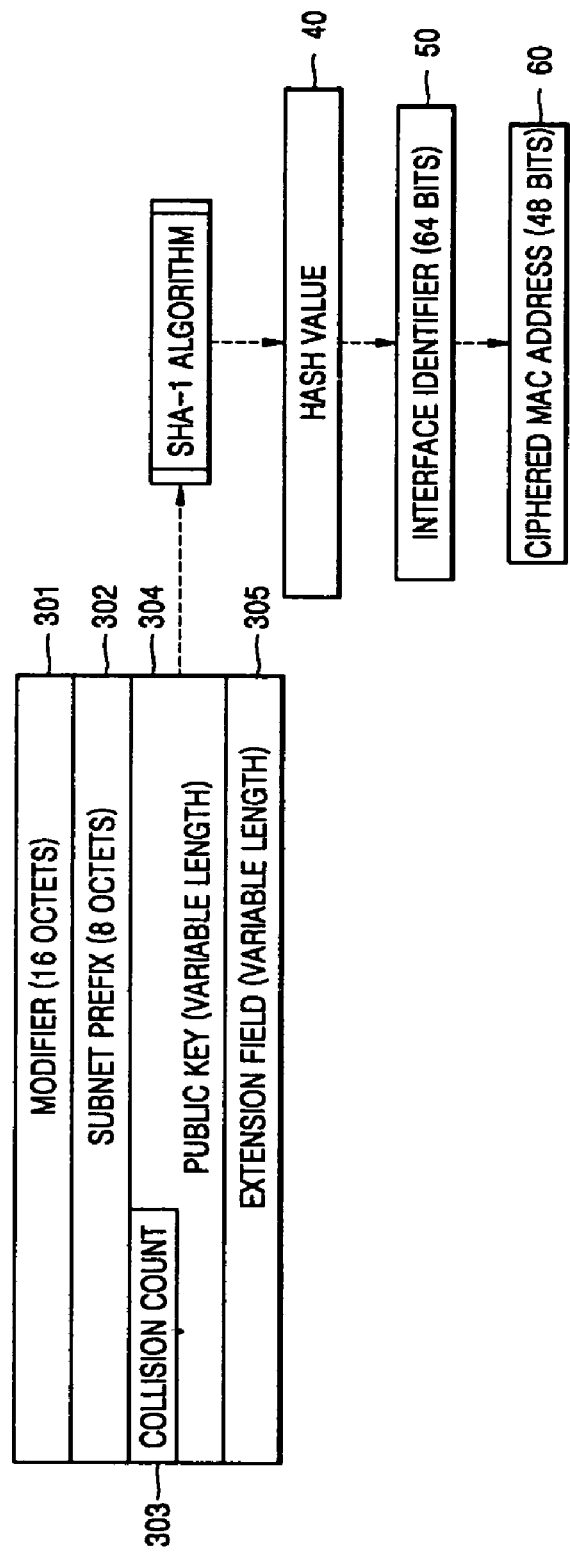
FIG. 5 is a diagram illustrating the generation of a MAC address according to an exemplary embodiment of the present invention.

FIG. 5 is a diagram illustrating the generation of a MAC address according to an exemplary embodiment of the present invention. Referring to FIG. 5, CGA parameters necessary for generating a CGA include a modifier 301, a subnet prefix 302, a collision count 303, a public key 304, and an extension field 305.

The modifier 301 is an arbitrary unsigned integer comprised of 128 bits. The subnet prefix 302 is a subnet prefix of a CGA and is comprised of 64 bits. The collision count 303 is an unsigned integer comprised of 8 bits. The collision count 303 may be 0, 1, or 2. The collision count 303 increases whenever an address collision is detected through duplicate address detection in the process of generating the CGA. The public key 304 is a public key of a holder of the CGA and has a variable length. The extension field 305 is not currently used and has a variable length.

Figure 1:
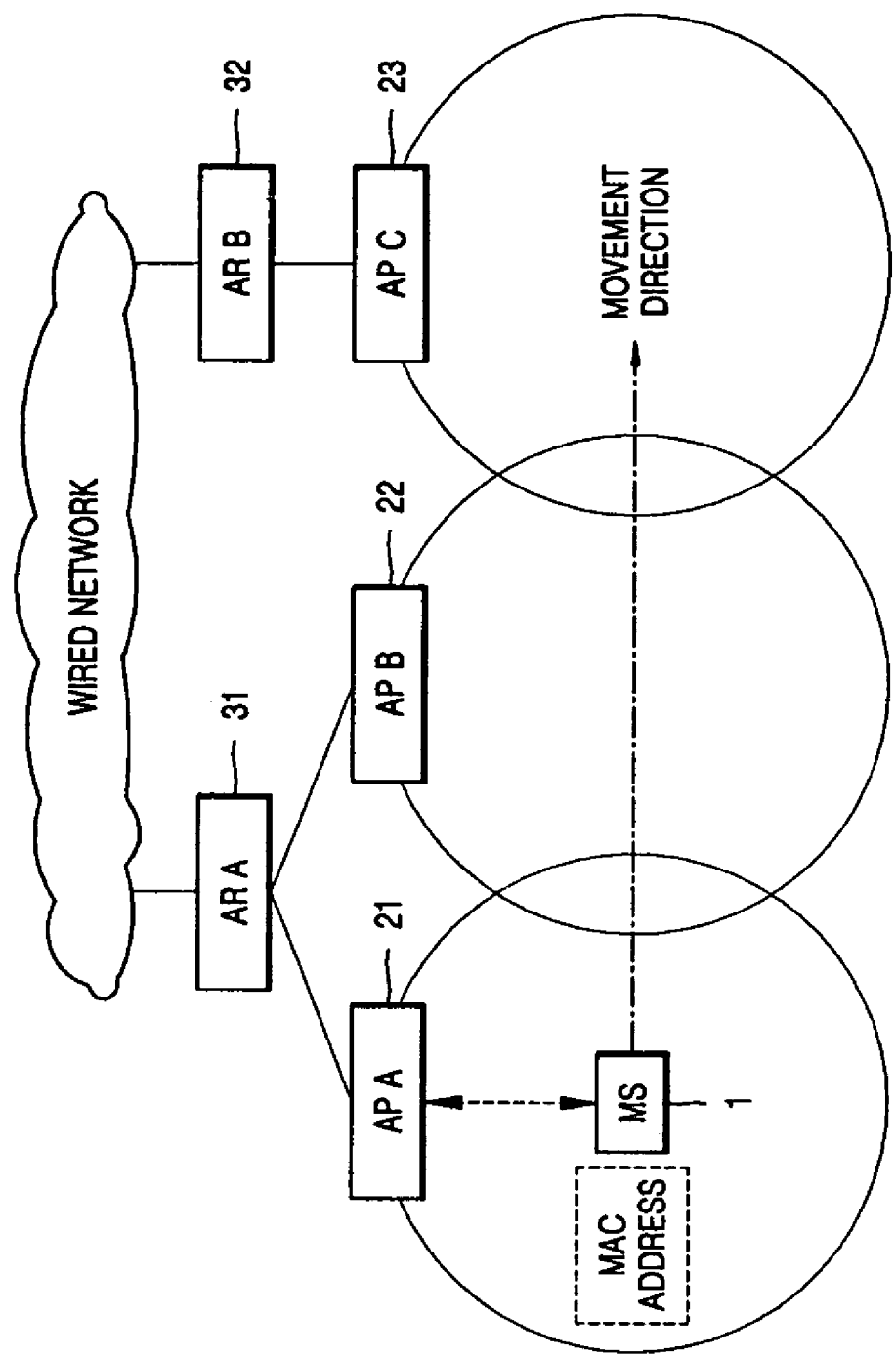
FIG. 1 is a diagram illustrating a conventional wireless LAN environment.
Figure 2:
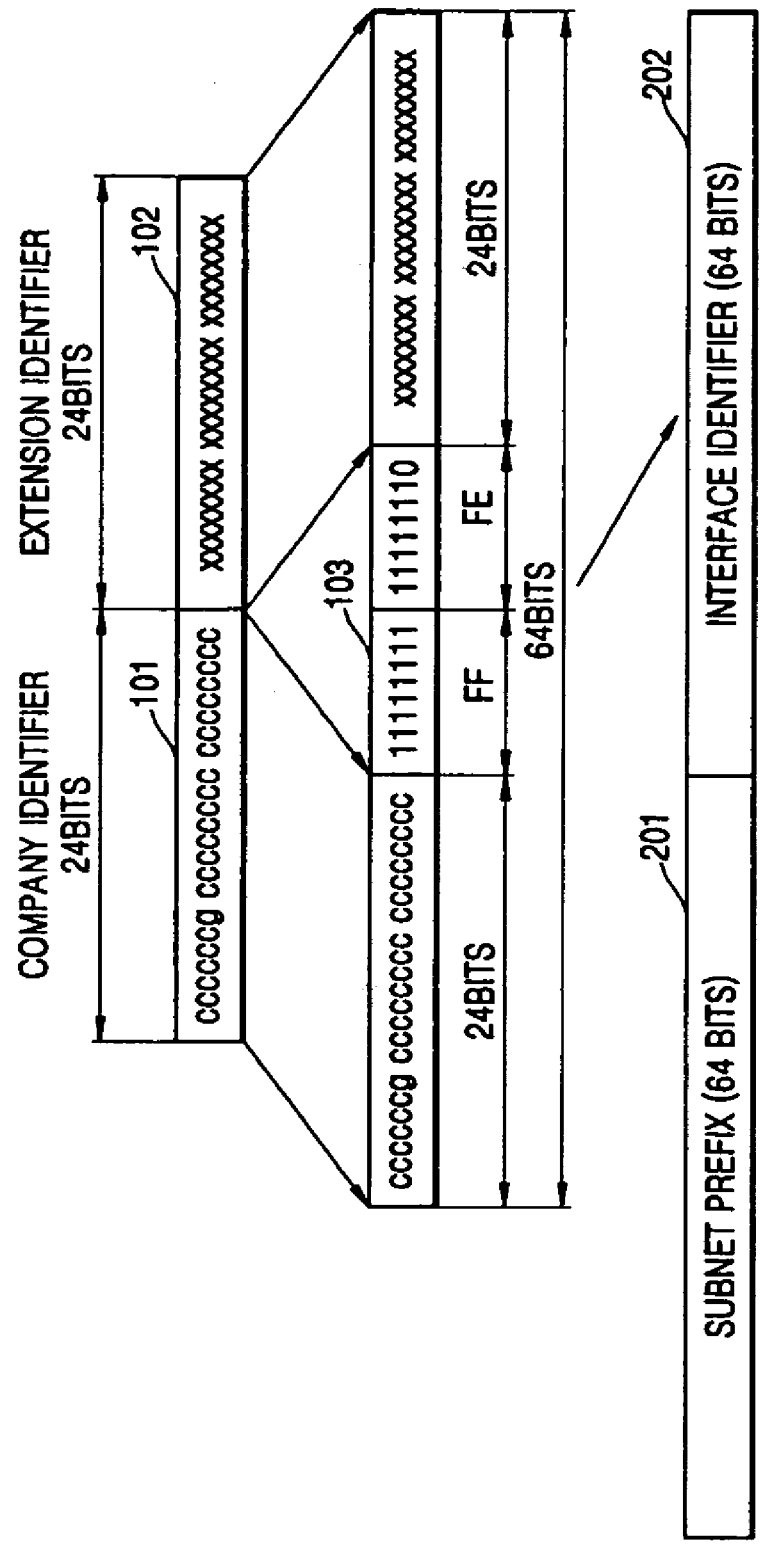
FIG. 2 is a diagram illustrating the formats of conventional MAC addresses.

The CGA generation unit 41 concatenates the modifier 301, the subnet prefix 302, the collision count 303, and the public key 304 and performs the SHA-1 algorithm on the concatenation result, thereby generating a hash value 40. The CGA generation unit 41 generates a 64-bit interface identifier 50 of an IPv6 address by taking 64 leftmost bits of the hash value 40, setting the three leftmost bits of the hash value 40 as a security parameter Sec, and setting the sixth and seventh bits (i.e., bits u and g of FIG. 2) of the hash value 40 to 0.

As described above, a CGA is generated using the subnet prefix 302. Thus, a new CGA must be generated whenever the mobile station 4 moves from one subnet to another subnet. Accordingly, a new interface identifier 50 and a new MAC address are also generated whenever the mobile station 4 moves from one subnet to another. Therefore, the mobile station 4 is able to use different MAC addresses for different subnets, and thus, the security of MAC addresses is strengthened.

The MAC address extraction unit 42 extracts 48 bits from the left, right side or middle of the interface identifier 50 generated by the CGA generation unit 41 and uses the extracted 48 bits as a MAC address. The MAC address extraction unit 42 extracts a new MAC address 60 from a new interface identifier 50 generated by the CGA generation unit 41 whenever the mobile station 4 moves from one subnet to another subnet.

The communication unit 43 communicates with AP A (51), AP B (52), or AP C (53) (FIG. 3) in a link layer using the MAC address extracted by the MAC address extraction unit 42. Specifically, the communication unit 43 searches for an AP that it can currently communicate with in a passive or active manner. In the passive manner, the mobile station 4 searches for the AP that it can currently communicate with by receiving beacon frames from AP A (51), AP B (52), and AP C (53). Alternatively, in the active manner, the mobile station 1 searches for the AP that it can currently communicate with by transmitting probe request frames to AP A (51), AP B (52), and AP C (53).

Referring to FIG. 3, if the AP that can currently communicate with the mobile station 4 is AP A (51), the mobile station 4 transmits an association request frame or re-association request frame to AP A (51) using the MAC address extracted by the MAC address extraction unit 42 as a source address and the MAC address of AP A (51) as a destination address in order to associate or re-associate with AP A (51). Thereafter, the mobile station 4 confirms that it has associated or re-associated with AP A (51) when receiving a response frame from AP A (51) and communicates with terminals in a wired network via AP A (51). An example of the wired network is the Internet.

Figure 6:
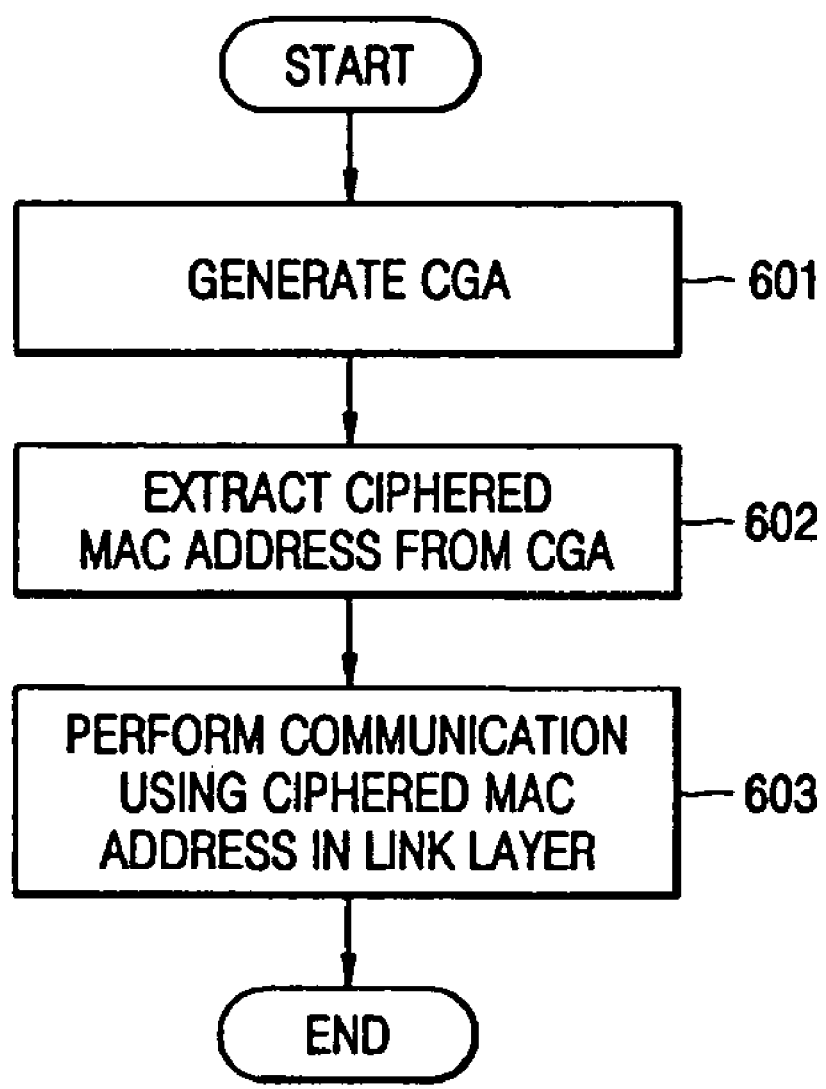
FIG. 6 is a flowchart of a method of securing MAC addresses according to an exemplary embodiment of the present invention.

FIG. 6 is a flowchart of a method of securing MAC addresses according to an exemplary embodiment of the present invention. Referring to FIG. 6, the method of securing MAC addresses involves the operations sequentially performed in the apparatus for securing MAC addresses installed in the mobile station 4 of FIG. 3. Principles applied to the apparatus for securing MAC addresses installed in the mobile station 4 are also applicable to the method of securing MAC addresses even though not specifically mentioned in the following paragraphs.

In operation 601, the mobile station 4 generates a CGA, which is an IPv6 address ciphered using the SHA-1 algorithm. The mobile station 4 generates the CGA whenever it moves from one subnet to another subnet.

In operation 602, the mobile station 4 extracts a ciphered MAC address from the CGA generated in operation 601. The mobile station 4 extracts the ciphered MAC address from the CGA generated whenever it moves from one subnet to another subnet.

In operation 603, the mobile station 4 communicates with AP A (51), AP B (52), or AP C (53) in a link layer using the MAC address extracted in operation 602.

Thereafter, the mobile station may generate an IPv6 address based on the MAC address extracted in operation 602 and then perform a duplicate address detection operation for the IPv6 address in order to perform communications in an IP layer. However, in an exemplary embodiment of the present embodiment, the MAC address is generated based on the modifier 301 of FIG. 5, which is an arbitrary value, and changes whenever the mobile station 4 moves from one subnet to another subnet. Thus, the possibility of the MAC address being duplicated is extremely low. Accordingly, the duplicate address detection operation may be skipped.

The exemplary embodiments of the present invention can be written as programs written on a computer-readable recording medium so that the programs can be executed in a computer. The programs can be written on the computer-readable recording medium using various means.

Examples of the computer-readable recording medium include a magnetic storage medium (e.g., a ROM, a floppy disc, or a hard disc), an optical storage medium (e.g., a CD-ROM or a DVD), and a carrier wave (e.g., data transmission through the Internet).

According to an exemplary embodiment of the present invention, it is possible to strengthen the security of MAC addresses using ciphered MAC addresses. Accordingly, even if an unauthorized person or party knows about MAC addresses, it is almost impossible for the unauthorized person or party to recognize users of the MAC addresses. Thus, it is possible to prevent the unauthorized person or party from interfering with authorized users' communications using the MAC addresses, stealing the authorized users' personal information, or exploiting the authorized users' communications for illegal purposes.

In addition, a new MAC address is generated whenever a mobile station moves from one subnet to another subnet. Thus, it is possible to further strengthen the security of MAC addresses. Moreover, there is no need to use algorithms other than a CGA algorithm, which is specified in the next generation IP, i.e., IPv6, to generate ciphered MAC addresses.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of securing at least one address, comprising:
generating a ciphered first address using a predetermined cipher algorithm;
extracting a ciphered second address from the ciphered first address; and
communicating using the ciphered second address.

2. The method of claim 1, wherein the predetermined cipher algorithm uses a unidirectional hash function.

3. The method of claim 1, wherein the ciphered first address is an interface identifier of an internet protocol version 6 (IPv6) address, and the ciphered second address is a media access control (MAC) address.

4. The method of claim 3, wherein in the extracting of the ciphered second address from the ciphered first address, part of the interface identifier of the IPv6 address is extracted as the ciphered second address.

5. The method of claim 3, wherein said communicating is performed in a link layer using the MAC address.

6. The method of claim 1, wherein in the generating of the ciphered first address, the ciphered first address is generated by applying the predetermined cipher algorithm to a plurality of parameters including a subnet prefix and a public key of the internet protocol version 6 (IPv6) address.

7. The method of claim 4, wherein in the extracting of the ciphered second address from the ciphered first address, the ciphered second address is extracted from the ciphered first address whenever the subnet prefix of the IPv6 address changes.

8. An apparatus for securing at least one address, comprising:
a first address generation unit, which generates a ciphered first address using a predetermined cipher algorithm;
a second address extraction unit, which extracts a ciphered second address from the first ciphered address; and
a communication unit, which communicates using the ciphered second address.

9. The apparatus of claim 8, wherein the predetermined cipher algorithm uses a unidirectional hash function.

10. The apparatus of claim 8, wherein the ciphered first address is an interface identifier of an internet protocol version 6 (IPv6) address, and the ciphered second address is a media access control (MAC) address.

11. The apparatus of claim 10, wherein the first address generation unit generates the ciphered first address by applying the predetermined cipher algorithm to a plurality of parameters including a subnet prefix and a public key of the internet protocol version 6 (IPv6) address.

12. The apparatus of claim 11, wherein the ciphered second address extraction unit extracts the ciphered second address from the ciphered first address whenever the subnet prefix of the IPv6 address changes.

13. The apparatus of claim 10, wherein the ciphered second address extraction unit extracts part of the interface identifier of the IPv6 address as the ciphered second address.

14. The apparatus of claim 10, wherein the communication unit performs communication in a link layer using the MAC address.

15. A computer-readable recording medium for storing a program enabling a method of securing at least one address, the method comprising:
generating a ciphered first address using a predetermined cipher algorithm;
extracting a ciphered second address from the ciphered first address; and
communicating using the ciphered second address.

* * * * *